(12) United States Patent
Avila

(10) Patent No.: US 10,597,000 B2
(45) Date of Patent: Mar. 24, 2020

(54) GLASS BREAK SENSOR SYSTEM

(71) Applicant: INNOVATIVE AFTERMARKET GROUP, Phoenix, AZ (US)

(72) Inventor: Carl Anthony Avila, Phoenix, AZ (US)

(73) Assignee: INNOVATIVE AFTERMARKET GROUP, Phoenix, AZ (US)

( * ) Notice: Subject to any disclaimer, the term of this patent is extended or adjusted under 35 U.S.C. 154(b) by 0 days.

(21) Appl. No.: 15/549,986

(22) PCT Filed: Feb. 24, 2016

(86) PCT No.: PCT/US2016/019407
§ 371 (c)(1),
(2) Date: Aug. 9, 2017

(87) PCT Pub. No.: WO2016/138170
PCT Pub. Date: Sep. 1, 2016

(65) Prior Publication Data
US 2018/0022316 A1      Jan. 25, 2018

Related U.S. Application Data

(60) Provisional application No. 62/134,349, filed on Mar. 17, 2015, provisional application No. 62/120,203, filed on Feb. 24, 2015.

(51) Int. Cl.
| | | |
|---|---|---|
| *B60R 25/34* | (2013.01) | |
| *B60R 25/102* | (2013.01) | |
| *B60R 25/10* | (2013.01) | |
| *B60R 25/33* | (2013.01) | |
| *B60R 25/40* | (2013.01) | |

(52) U.S. Cl.
CPC ............ *B60R 25/34* (2013.01); *B60R 25/102* (2013.01); *B60R 25/1004* (2013.01); *B60R 25/33* (2013.01); *B60R 25/403* (2013.01)

(58) Field of Classification Search
CPC combination set(s) only.
See application file for complete search history.

(56) References Cited

U.S. PATENT DOCUMENTS

| | | |
|---|---|---|
| 5,481,253 A | 1/1996 | Phelan et al. |
| 5,523,948 A | 6/1996 | Adrain |
| 5,719,551 A | 2/1998 | Flick |
| 6,011,460 A | 1/2000 | Flick |
| 6,535,116 B1 * | 3/2003 | Zhou ..................... B60C 23/009 340/438 |
| 6,696,927 B2 | 2/2004 | Flick |
| 6,956,467 B1 | 10/2005 | Mercado, Jr. |

(Continued)

*Primary Examiner* — Rami Khatib
(74) *Attorney, Agent, or Firm* — Richard E. Oney; Venjuris, P.C.

(57) ABSTRACT

A glass break sensor system is provided for a vehicle having an on-board diagnostic ("OBD") data link cable and an OBD port. The system includes a modular unit having a microprocessor, a glass break sensor, and a pass-through OBD connector including an input connector configured to mate with the vehicle OB) data link cable and an output connector configured to mate with an input to the vehicle OBD port. The input connector includes a power input configured to be coupled to a vehicle battery voltage input of the 0131 data link cable and to provide power to the glass break sensor device.

23 Claims, 14 Drawing Sheets

(56) References Cited

U.S. PATENT DOCUMENTS

| | | | |
|---|---|---|---|
| 7,859,129 B2* | 12/2010 | Ozawa | B60R 25/04 |
| | | | 307/10.2 |
| 8,334,760 B2* | 12/2012 | Tanaka | B60H 1/00642 |
| | | | 340/426.1 |
| 8,648,709 B2 | 2/2014 | Gauger et al. | |
| 2002/0003472 A1 | 1/2002 | Katsutoghi et al. | |
| 2004/0075541 A1 | 4/2004 | Simoneau | |
| 2007/0156311 A1 | 7/2007 | Elcock et al. | |
| 2007/0236341 A1* | 10/2007 | Mackjust | B60R 25/104 |
| | | | 340/426.13 |
| 2009/0051510 A1 | 2/2009 | Haruna et al. | |
| 2013/0295912 A1* | 11/2013 | Chen | H04W 4/00 |
| | | | 455/420 |
| 2014/0104048 A1 | 4/2014 | De Kock et al. | |

\* cited by examiner

GLASS BREAK SENSOR SYSTEM

RELATED APPLICATIONS

This application claims the benefit of U.S. Provisional Application Nos. 62/120,203 and 62/134,349, filed Feb. 24, 2015 and Mar. 17, 2015, respectively, entitled "OBD Glass Break Sensor System," which are incorporated herein in their entirety by this reference.

BACKGROUND

This invention relates to security systems for sensing vehicle intrusion events resulting in glass breakage. More particularly, it relates to such a system contained in a single module that can easily be installed in a vehicle by plugging the module into the vehicle's on-board diagnostic ("OBD") system between the back of the factory-installed OBD port and the OBD cable that plugs into the rear of that port.

Security systems for automobiles are in common use today to protect against unauthorized entry into the vehicle by sounding an alarm in the event of a detected intrusion event. The systems include trigger and sensor devices for monitoring the status of doors and other entry points such as the hood and trunk, and may include glass break sensor devices for detecting motion or shock/vibrations to the vehicle or sounds when glass breakage occurs.

Many security systems are after-market items that are installed in a vehicle after it is purchased, and glass break sensor systems are installed as part of such an after-market security system. There are a number of drawbacks to these after-market glass break sensor systems. For example, installing such a system requires cutting and splicing factory installed wires in the vehicles. Also, arming such systems is typically done manually using a fob that is separate from the factory provided vehicle key fob, thereby requiring the owner to carry multiple fobs. Also, none of these conventional glass break sensors can be installed as a standalone device without a full security system.

It is therefore an object of the present invention to provide an after-market glass break sensor system that can be quickly and conveniently installed in a vehicle without cutting or splicing vehicle wires.

Another object of the invention is to provide such a glass break sensor system that can be automatically armed and disarmed without the necessity of using a separate fob.

Still another object of the invention is to provide such a glass break sensor system that can be installed as a stand-alone system and that can also easily interface with a security system having additional security features.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification, including the appended claims.

SUMMARY

To achieve the foregoing objects, and in accordance with the purposes of the invention as embodied and broadly described in this document, there is provided a glass break sensor system for a vehicle having an OBD data link cable and an OBD port. The system includes a modular unit having a microprocessor, a glass break sensor, and a pass-through OBD connector including an input connector configured to mate with the vehicle OBD data link cable and an output connector configured to mate with an input to the vehicle OBD port. The input connector includes a power input configured to be coupled to a vehicle battery voltage input of the OBD data link cable and to provide power to the glass break sensor device. The glass break sensor is configured to detect a glass breakage event and to generate an alarm signal when glass breakage is detected. A microprocessor is configured to: use OBD data to monitor whether the vehicle engine is running; to automatically arm the glass break sensor when the vehicle engine is turned off, to automatically disarm the glass break sensor when the vehicle engine is on; and to cause the audio alarm to sound when the sensor generates an alarm signal.

According to one aspect of the invention, the glass break sensor system can include an accelerometer configured to detect when the vehicle is in motion and to generate a vehicle motion output signal. The microprocessor can be configured to use the accelerometer vehicle motion output signal to determine whether the vehicle is moving and whether an alarm signal generated by the sensor is a false positive.

According to another aspect of the invention, the microprocessor can be further configured to: communicate with a security system component that includes a GPS location component; and in response to an alarm signal generated by the sensor, cause the GPS component to send a location alert.

According to yet another aspect of the invention, the microprocessor can be further configured to: communicate with a security system component that includes a vehicle on-board camera; and in response to an alarm signal generated by the sensor, cause the camera to capture an image.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

FIG. 14 is a graph showing an exemplary electrical bus voltage waveform, which depicts the variation in the voltage with the engine off, the engine starting and the engine on.

DETAILED DESCRIPTION

Figure 1:
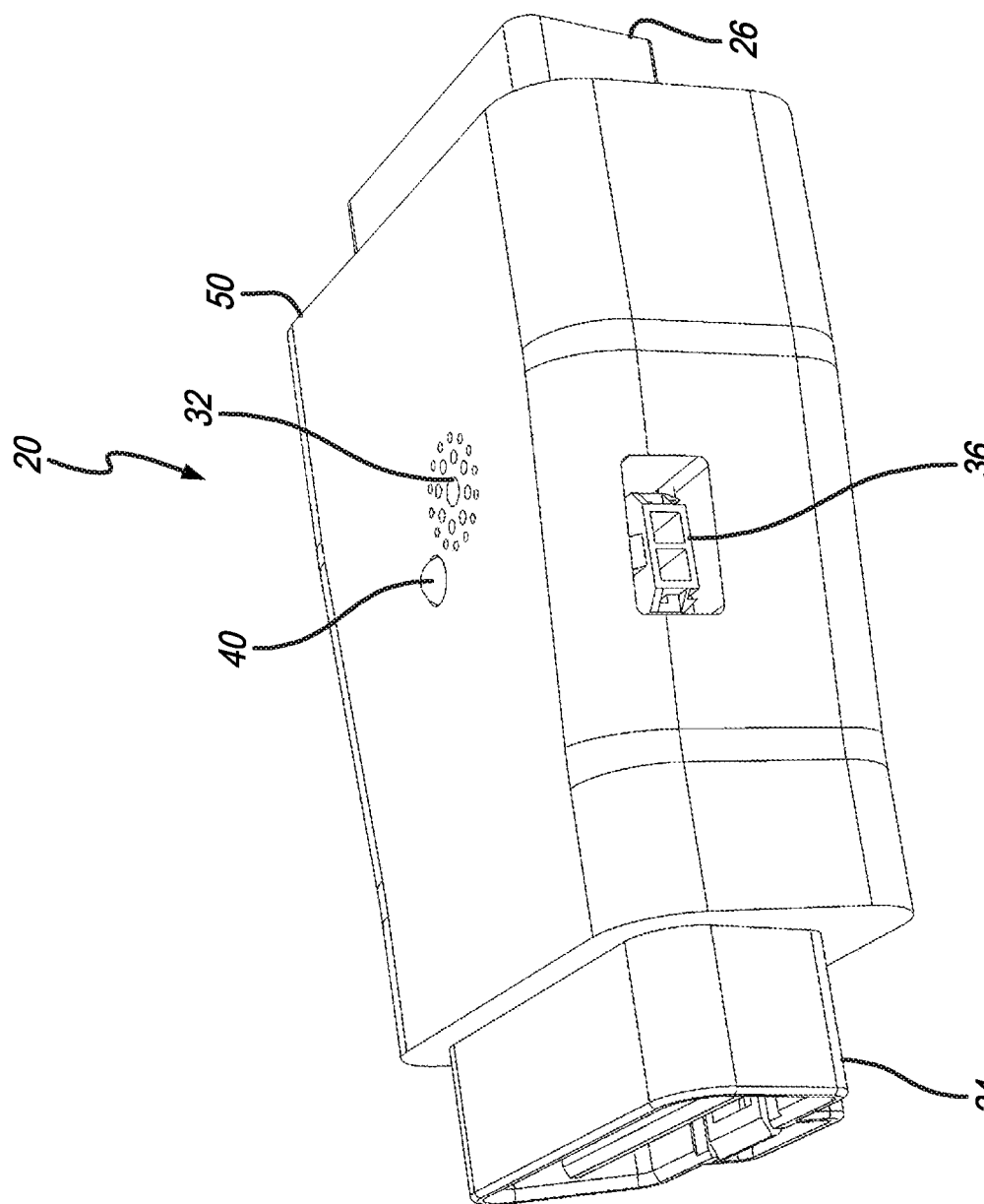
FIG. 1 is a top perspective view of one embodiment of a glass break sensor system according to the present invention, showing the modular unit with a housing cover in place.

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

Referring to FIGS. 1-7, a presently preferred embodiment of a glass break sensor system according to the present invention is shown. The system comprises a modular glass break sensor device 20 that includes a circuit board 22 with an input connector 24 and an output connector 26. The input connector 24 is configured to mate with the vehicle OBD data link cable (not shown) and the output connector 26 is configured to mate with the inputs to the vehicle OBD output port (not shown). The vehicle OBD data link cable outputs diagnostic information from the engine computer. In a presently preferred embodiment, the vehicle OBD output port is an OBD-II connector, which is a female 16-pin connector and is located in the cab of the vehicle. The SAE J1962 specification, which is incorporated herein by this reference, defines the pinout of the OBD-II data link connector, which pinout includes vehicle battery voltage on pin 16. The input connector 24 includes a power input configured to be coupled to the vehicle battery voltage pin of the OBD data link cable and to provide power to the glass break sensor device 20.

Mounted on the circuit board 22 is a microprocessor 28, a power relay, an accelerometer, a high dB audio alarm 32, an external power port (for an upgraded GPS device) and I/O connector port 36 (for glass break SMS text/email notification), an audio/vibration sensor, and an LED "arm" indicator 40. The microprocessor 28 includes a CPU and suitable memory and is configured and programmed to receive input signals and data, to make the necessary calculations using that data, and to provide output signals, all to operate the system as described in this specification.

In one embodiment, the audio/vibration sensor can detect audio frequencies in a range from around 350 Hz to around 6.5 kHz and can detect vibration or air pressure disturbances in frequencies from about 5 kHz to about 50 kHz. The audio/vibration sensor and the accelerometer can be implemented using a digital accelerometer, such as the MMA8453Q digital accelerometer marketed by Freescale Semiconductor, Inc.

Figure 2:
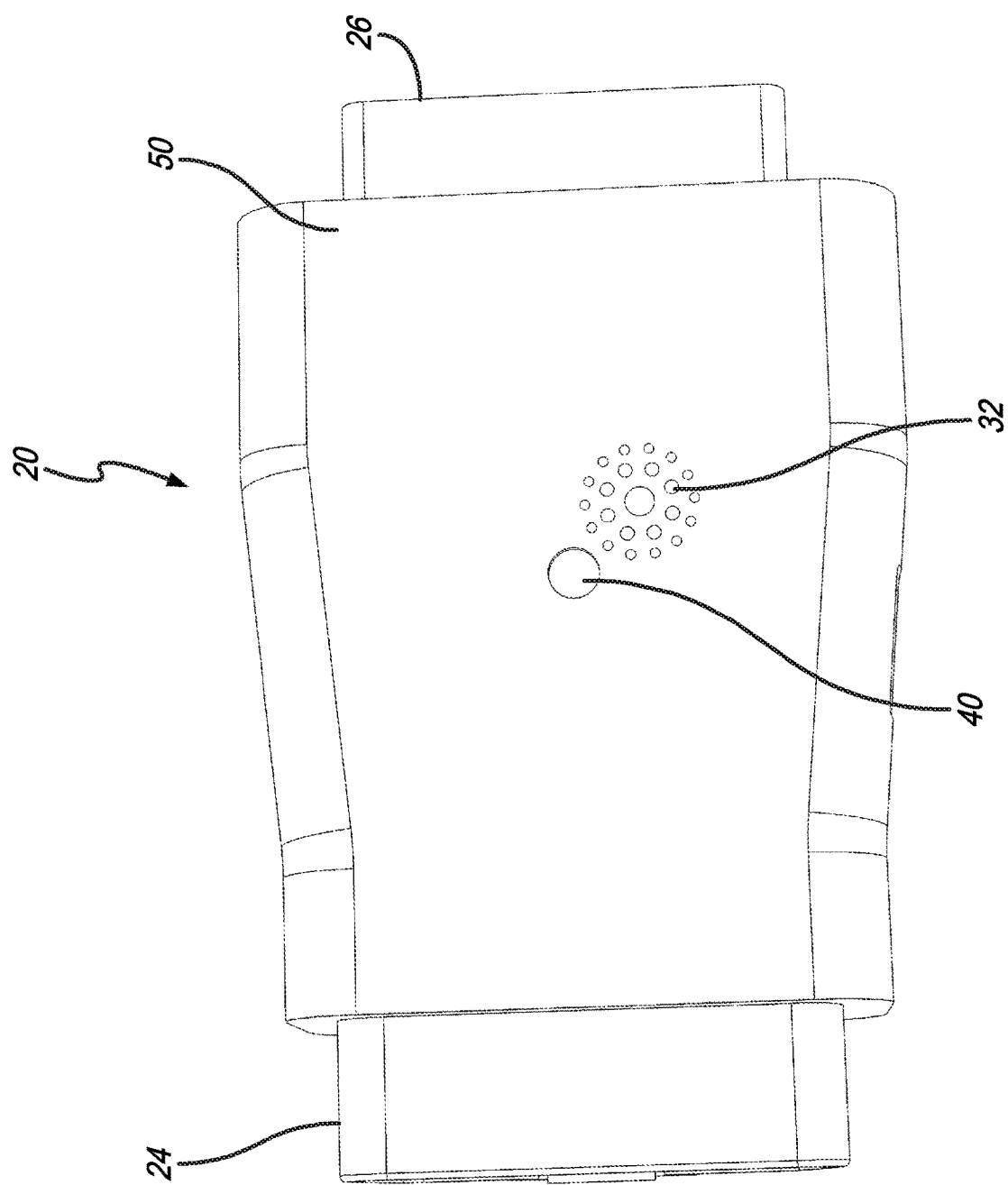
FIG. 2 is a top plan view of the glass break sensor system of FIG. 1.
Figure 3:
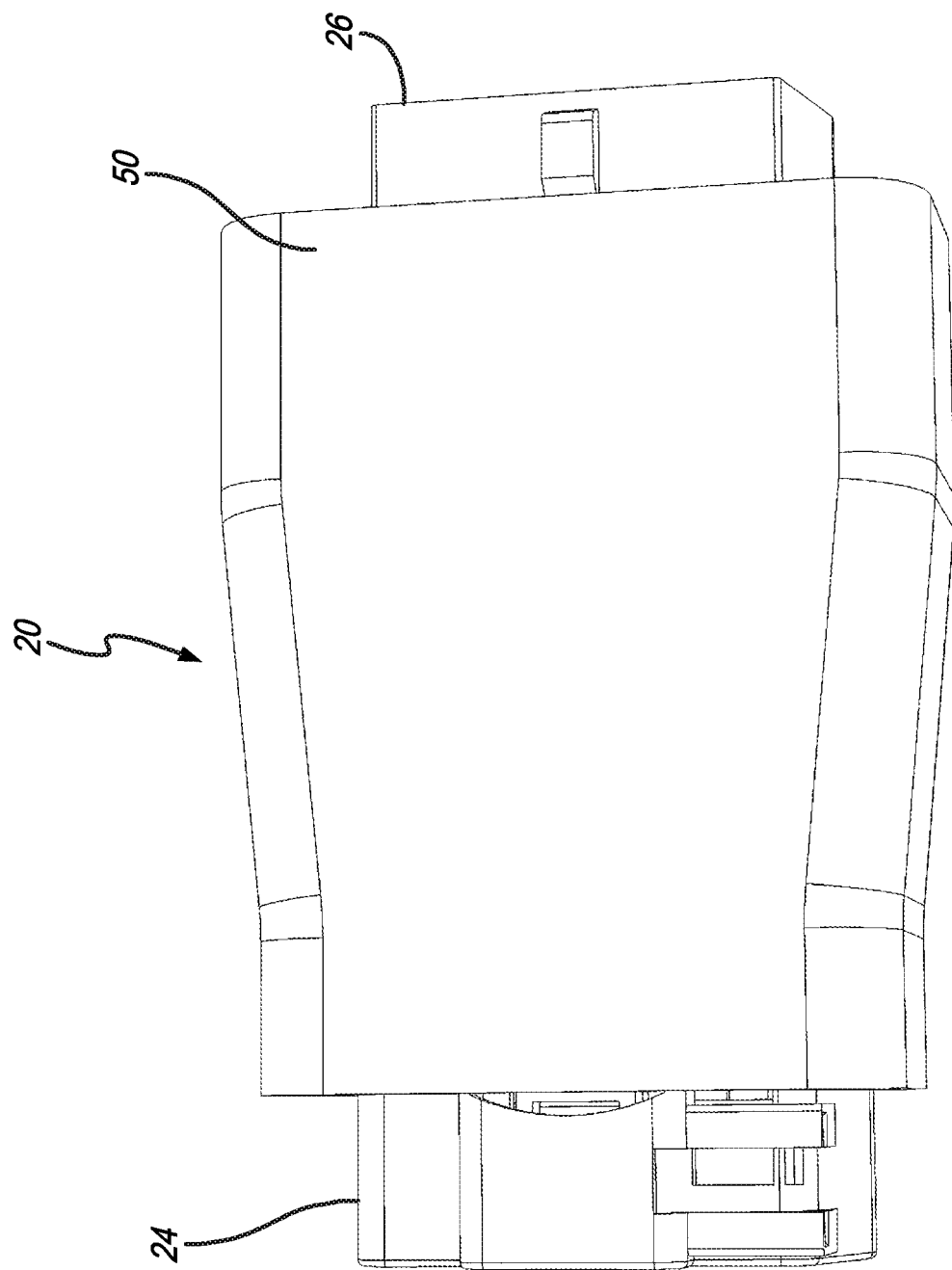
FIG. 3 is a bottom perspective view of the glass break sensor system of FIG. 1 with the housing cover in place.
Figure 4:
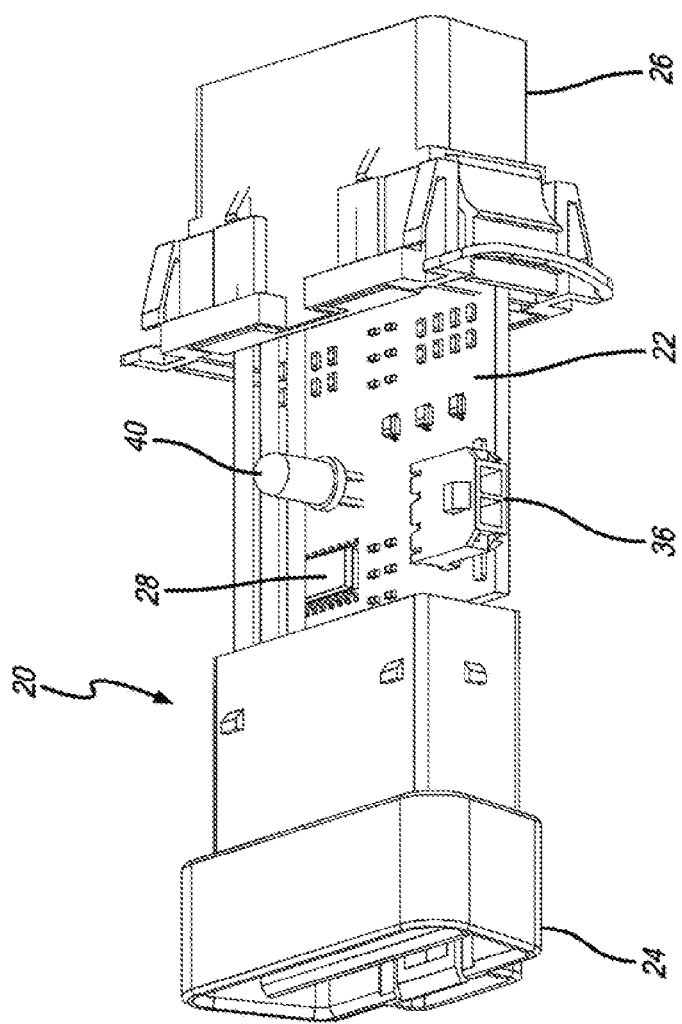
FIG. 4 is a top perspective view of the glass break sensor system of FIG. 1 with the housing cover removed.
Figure 5:
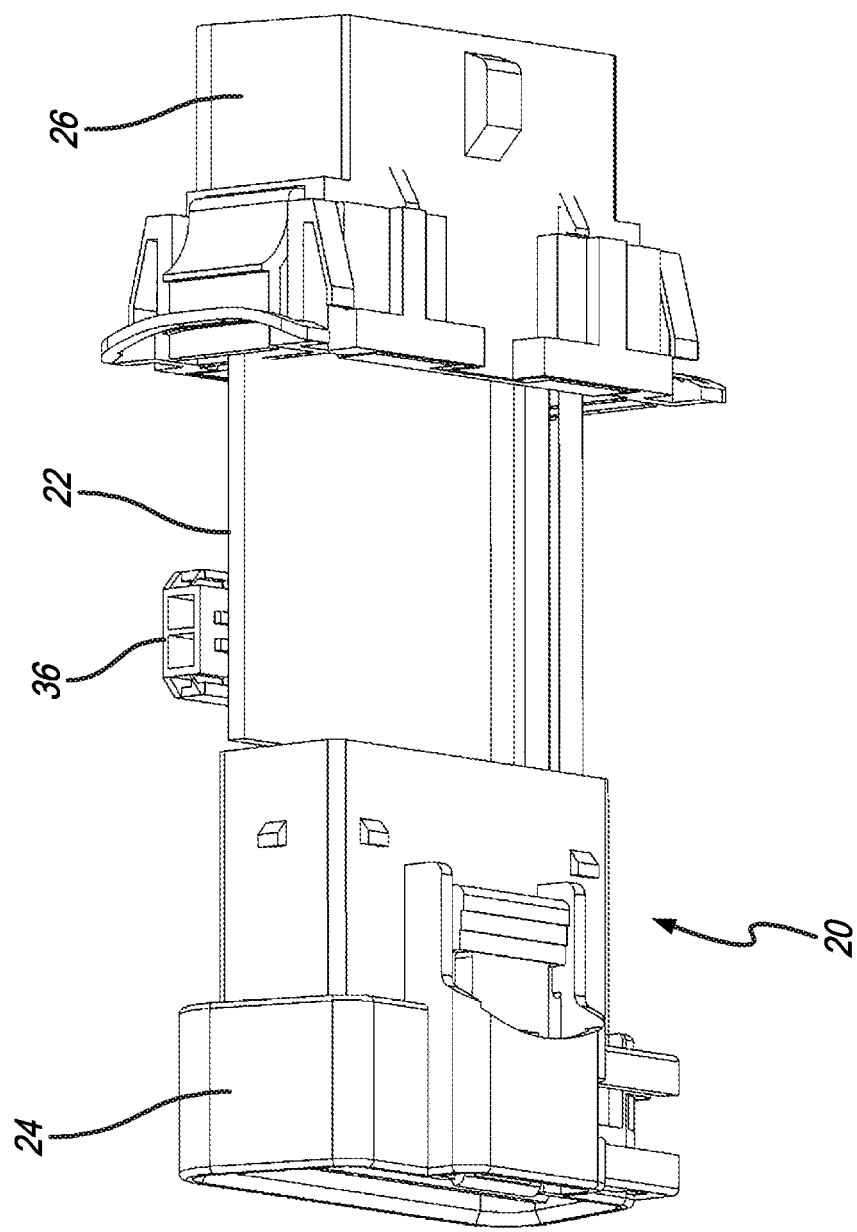
FIG. 5 is a bottom perspective view of the glass break sensor system of FIG. 1 with the housing cover removed.
Figure 6:
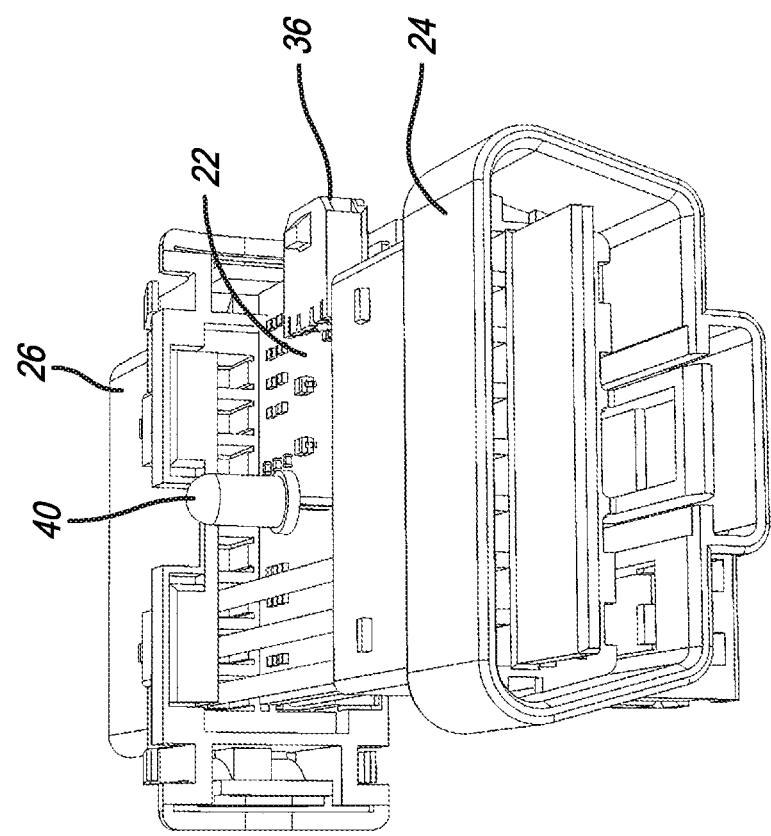
FIG. 6 is a top rear perspective view of the glass break sensor system of FIG. 1 with the housing cover removed.
Figure 7:
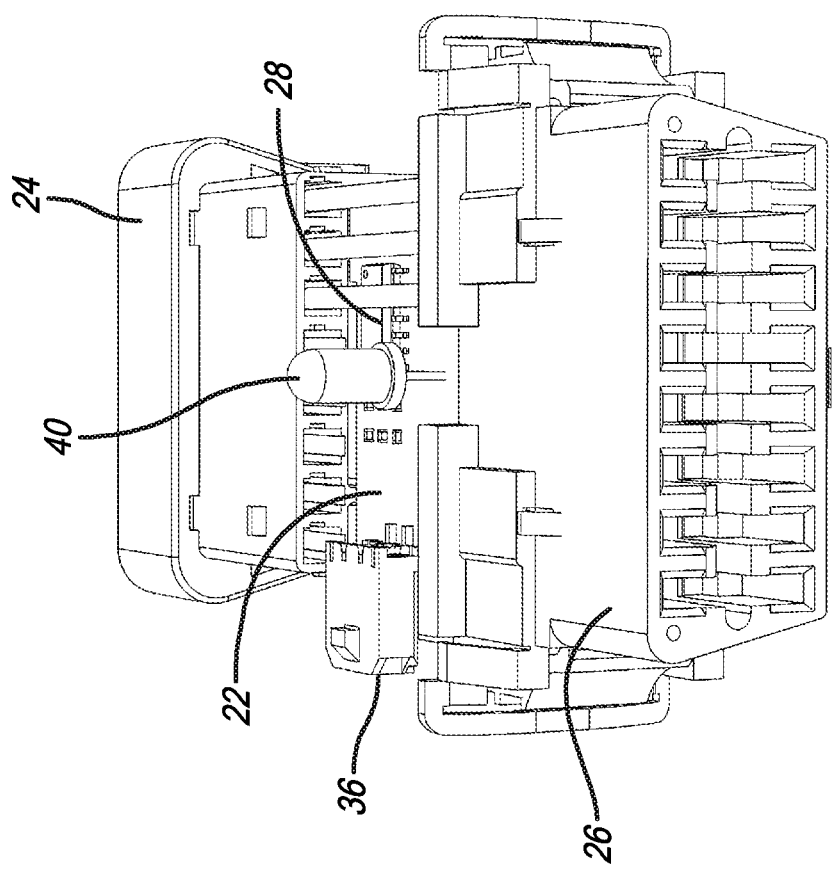
FIG. 7 is a top front perspective view of the glass break sensor system of FIG. 1 with the housing cover removed.

As shown in FIGS. 1-3, a housing cover 50 can be mounted on the glass break sensor device 20 to enclose the circuit board 22 and other components of the device 20. In one embodiment, the housing cover 50 can be made from molded plastic in two parts and is mounted to the device 20 by sliding it over the input connector 24 and clipping it onto the output connector 26 to enclose the circuit components described above.

In this configuration, the assembled glass break sensor device 20 is implemented in a single module that easily can be installed inside the cab of the vehicle between the vehicle OBD data link cable and the vehicle OBD output port. This is achieved by unplugging the factory OBD data link cable from the rear of the OBD output port, then plugging the OBD data link cable into the input connector 24 of the device 20 and plugging the device output connector 26 into the rear of the OBD output port. After installation, the device 20 is powered by 12-volt power from the vehicle on pin 16 of the OBD data link cable.

According to one aspect of the invention, the glass break sensor device 20 will automatically arm when the vehicle engine is off and automatically disarm when the vehicle engine is on. The microprocessor 28 constantly monitors inputs from the OBD data link cable to determine the state or condition of the vehicle's engine, i.e., whether the engine is on or off. This can be achieved by determining whether the ignition is on or off from sensing the power spike or power drop via the OBD pins. The microprocessor 28 uses this engine condition determination to control power to the audio/vibration sensor via the power relay in the device 20. In this configuration, the monitoring of the engine condition and arming/disarming of the glass break sensor device 20 is achieved using OBD information rather than information from the vehicle ECM (engine control module). An exemplary process for determining the engine condition in order to automatically arm and disarm the glass break sensor device 20 is discussed in more detail below.

Figure 8:
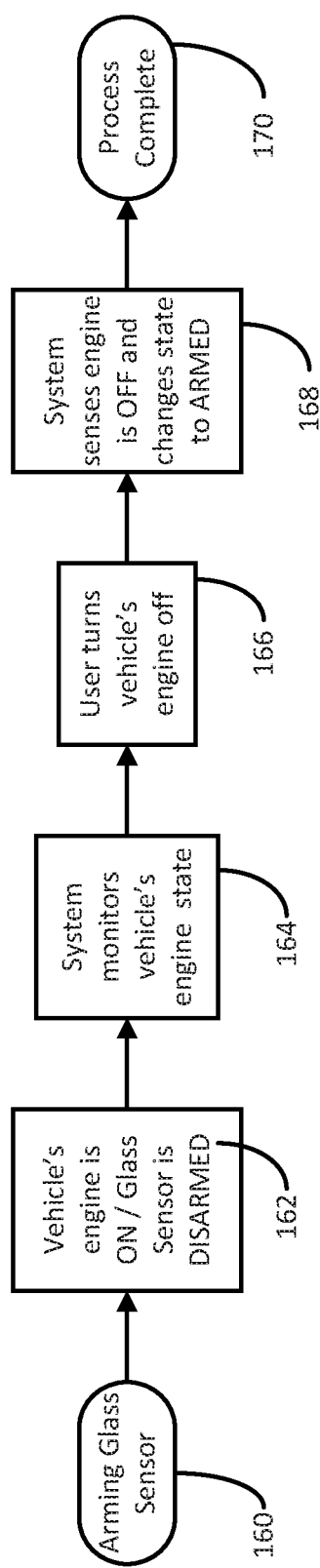
FIG. 8 is a flow diagram illustrating an exemplary process by which the glass break sensor system arms the glass break sensor according to the present invention.
Figure 9:
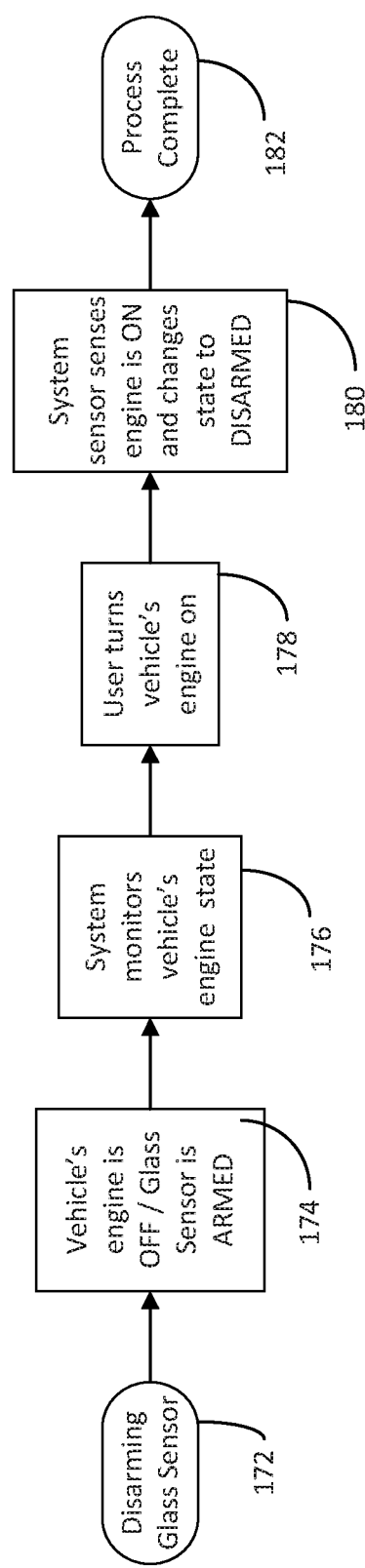
FIG. 9 is a flow diagram illustrating an exemplary process by which the glass break sensor system disarms the glass break sensor according to the present invention.

FIGS. 8 and 9 depict exemplary processes for arming and disarming the glass break sensor device 20. Referring to FIG. 8, after the arming process begins running (step 160) and when the vehicle engine is on, the microprocessor 28 sends a control signal to the power relay to turn off power to the audio/vibration sensor, thereby disarming the glass sensor device 20 (step 162) (i.e., placing it in a DISARMED state). The microprocessor 28 continues to monitor the vehicle engine condition (step 164), and when the vehicle engine turns off (step 166) (e.g., when the driver parks the vehicle and turns the engine off), the microprocessor 28 senses this and controls the power relay to supply power to the audio/vibration sensor, thereby arming the glass sensor device 20 (step 168) (i.e., placing it in an ARMED state) and completing the arming process (step 170).

Referring to FIG. 9, when the vehicle's engine remains off (step 174), the device 20 remains in the ARMED state and the microprocessor continues to monitor the vehicle engine condition (step 176). When the vehicle engine turns on (step 178) (e.g., when the driver turns the engine on), the microprocessor 28 senses this and controls the power relay to disable the audio/vibration sensor, thereby placing the glass sensor device 20 in the DISARMED state (step 180) and completing the disarming process (step 182).

Figure 10:
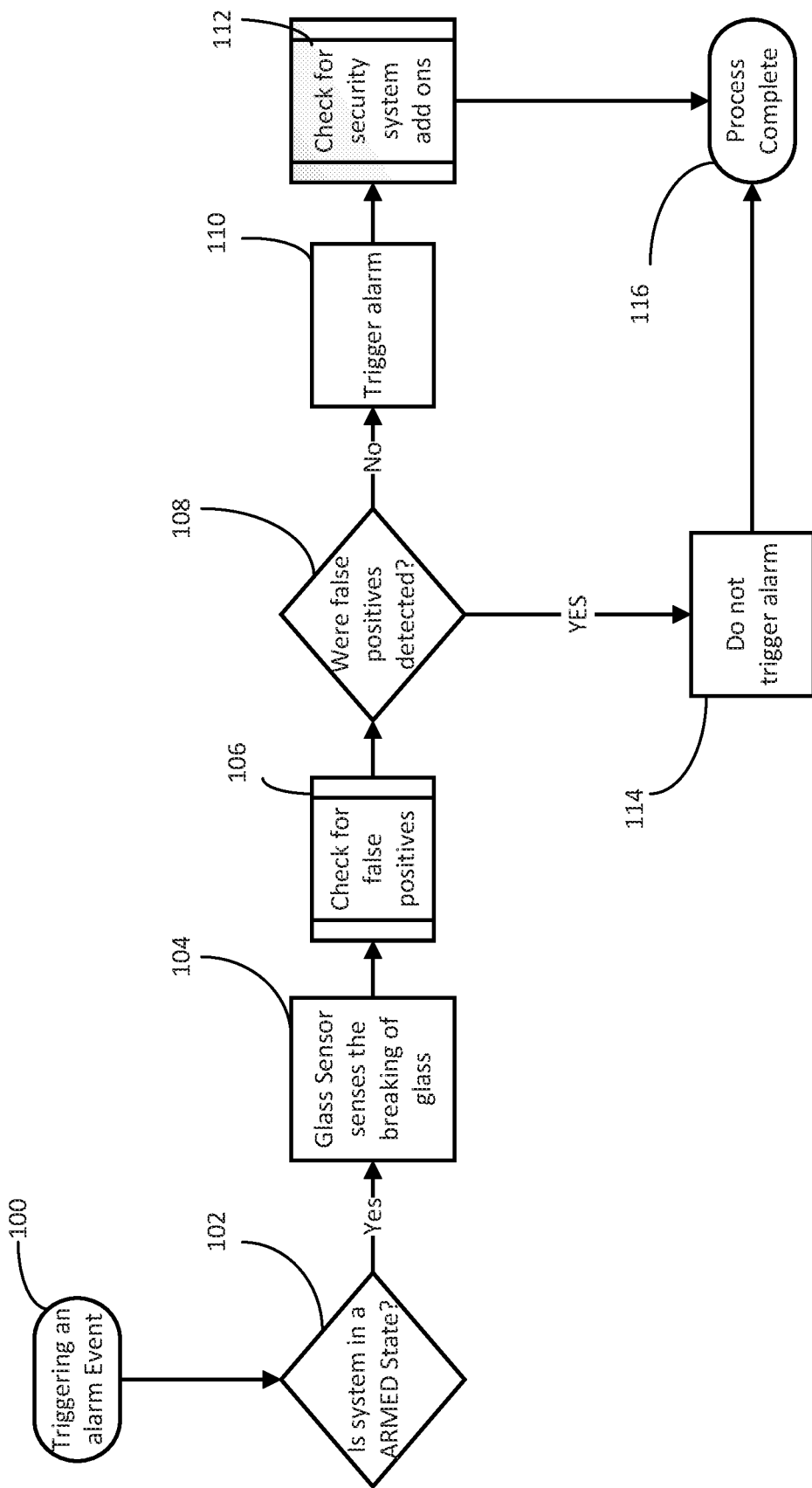
FIG. 10 is a flow diagram illustrating an exemplary process by which the glass break sensor system triggers an alarm event according to the present invention.

Referring to FIG. 10, an exemplary process for triggering an alarm event is described. After the process begins (step 100), the microprocessor 28 determines whether the glass break sensor device 20 is armed (step 102), which will occur when the vehicle's engine is turned off. When the audio/vibration sensor is triggered (step 104), such as by the breakage of glass, the processor will initiate a process to check for false positives (step 106). This process is described below in more detail, and returns a result (step 108). If no false positives are detected, the processor 28 will generate an alarm signal (step 100) and the audio alarm will sound. The processor 28 will then check for security system add-ons (step 112) as described in more detail below, and end the process for triggering an event (step 116). If a false positive is detected, the processor 28 will not generate an alarm signal (step 114) and will end the process for triggering an event (step 116). When the engine is turned on, the glass break system resets and the audio alarm is turned off.

Figure 11:
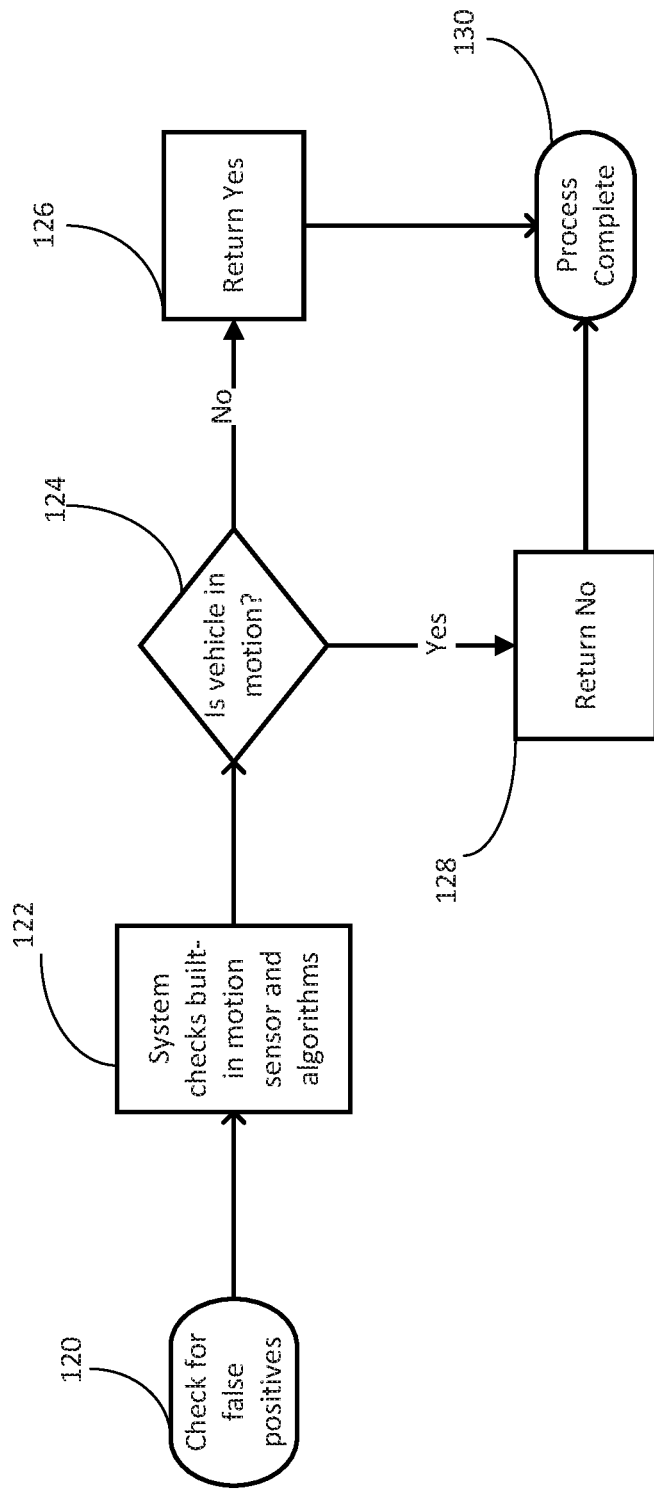
FIG. 11 is a flow diagram illustrating an exemplary process by which the glass break sensor system checks for false positives according to the present invention.

Referring to FIG. 11, an exemplary process for detecting false positives is described. When the process is initiated (step 120), the processor 28 processes inputs from the accelerometer (step 122) to determine whether the vehicle is in motion or not (step 124). If the vehicle is in motion, the microprocessor 28 will find that there is a false positive (step 126), it will complete the process for detecting false positives (step 130) and the alarm will not trigger (see steps 108, 114). If the vehicle is not in motion, the processor 28 will find that there is no false positive (step 128), will complete the process for detecting false positives (step 130) and will trigger an alarm (see steps 108, 110).

Figure 12:
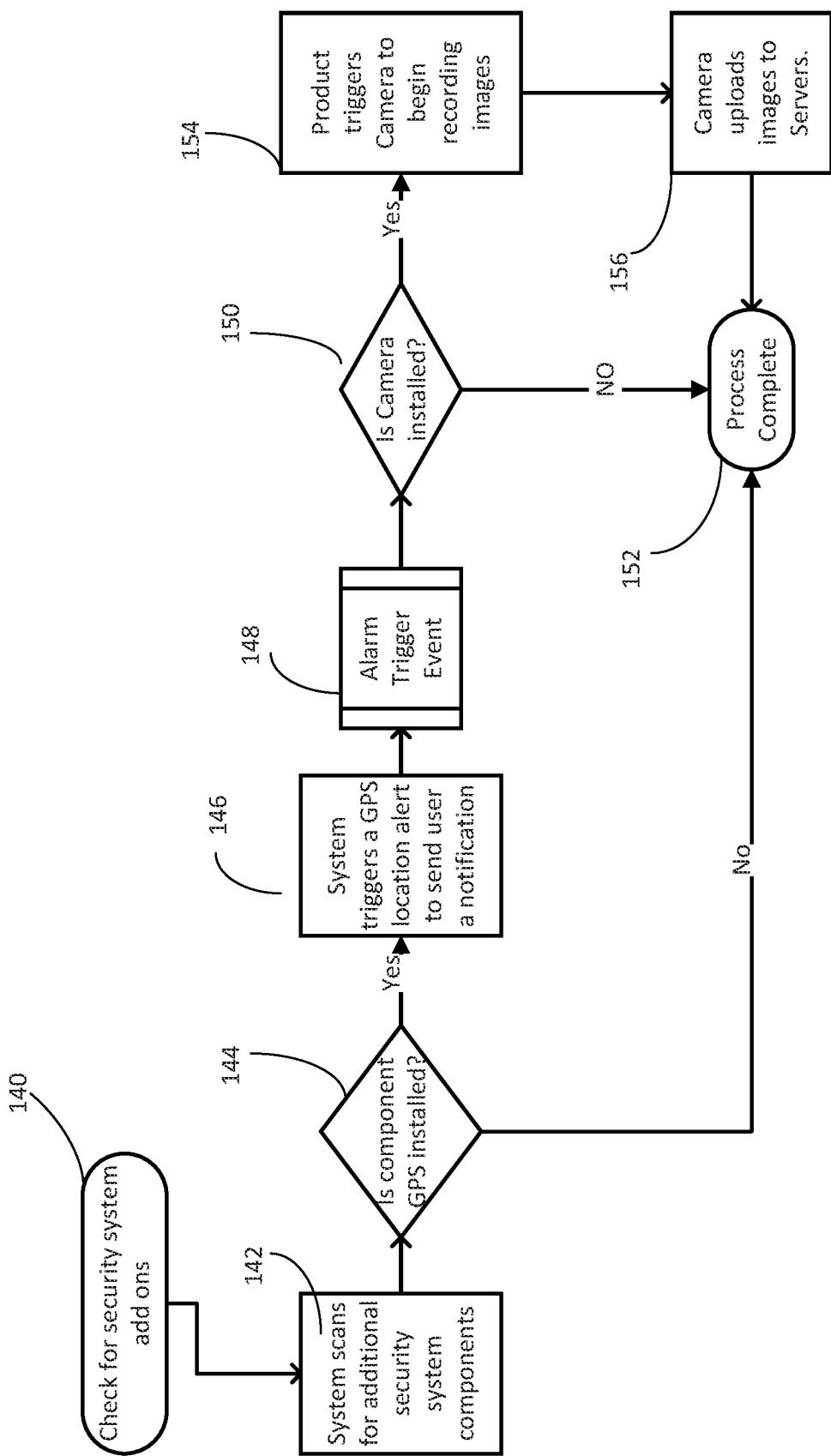
FIG. 12 is a flow diagram illustrating an exemplary process by which the glass break sensor system checks for security system add-ons according to the present invention.

Referring to FIG. 12, an exemplary process for checking for security system add-ons (step 112) is described. The microprocessor 28 can communicate with security system add-on components via the I/O connector port 36. When an alarm is triggered (step 110), the processor 28 activates the audio alarm 32 and begins the process (step 140) of checking for additional security system components (step 142), such as a GPS location component. If a GPS component is detected (step 144), the microprocessor 28 directs the GPS component to send a location alert (e.g., an SMS text notification and or email notification of a glass break occurrence with mapped address and time stamp) to the vehicle's owner or other user (step 146). In addition, an alert can be sent to a live monitoring center. Also, a trigger can be generated (step 148) for a vehicle on-board camera. If a camera is not installed (step 150), the process of checking for security add-ons is completed (step 152). If a camera is installed (step 150), the trigger can cause the camera to periodically capture images (e.g., pictures of the driver every 5 seconds over a 1-minute period), which can be uploaded to a server at a monitoring center or sent to the vehicle owner or other user, such as via a cellular network.

Figure 13A:
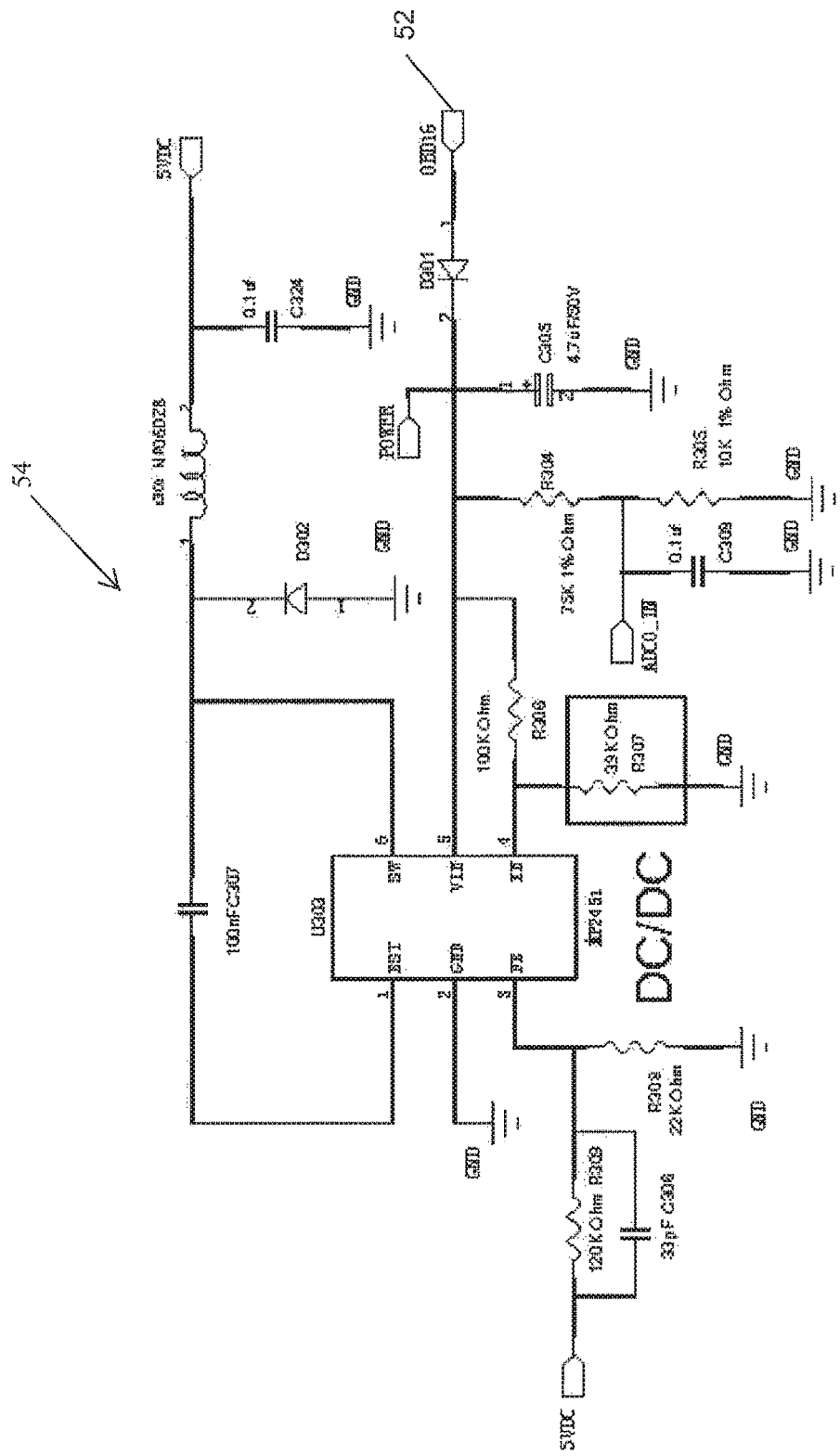
FIGS. 13A and 13B are schematic diagrams showing one embodiment of the electrical circuit and components of the glass break sensor system of FIG. 1 for regulating the vehicle battery voltage from the OBD connector and using that voltage as an input signal to determine the present condition of the vehicle's engine.
Figure 13B:
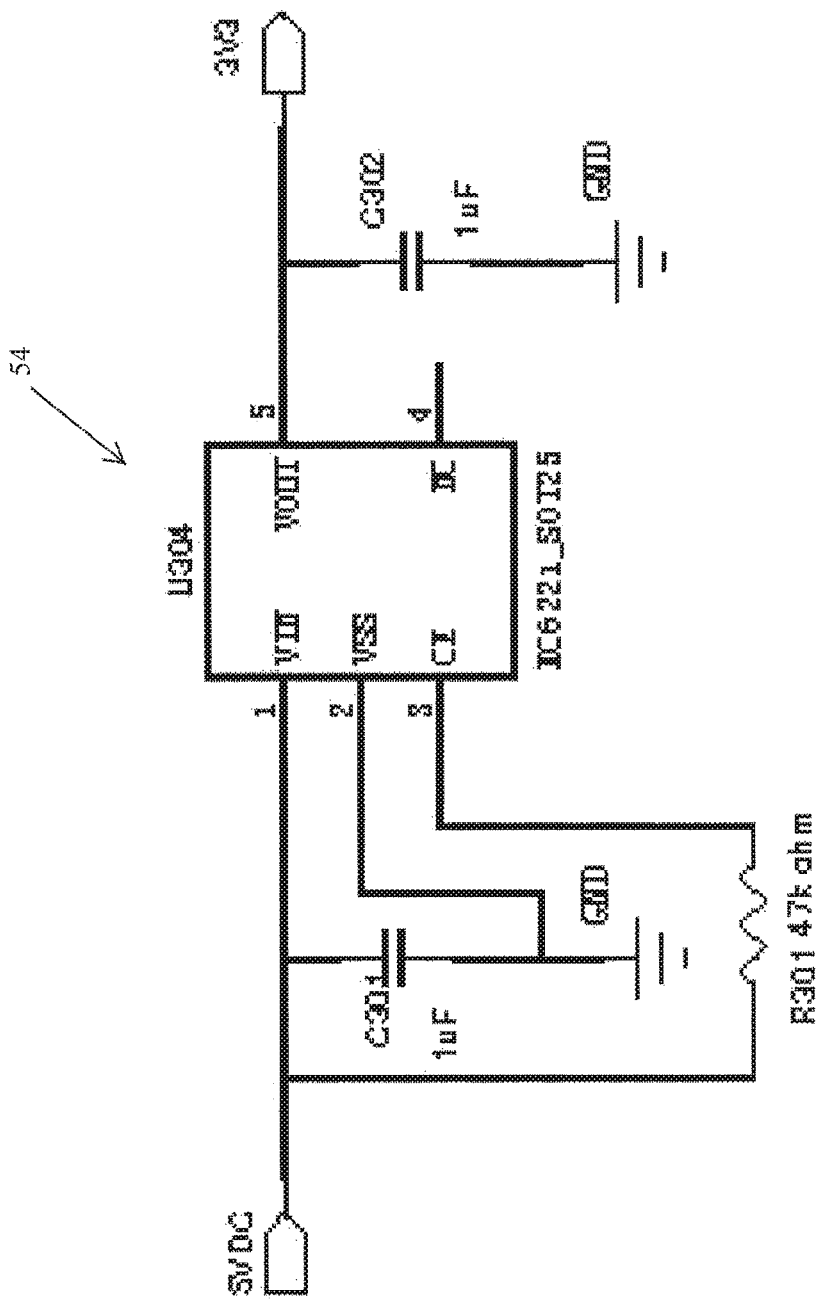
Figure 14:
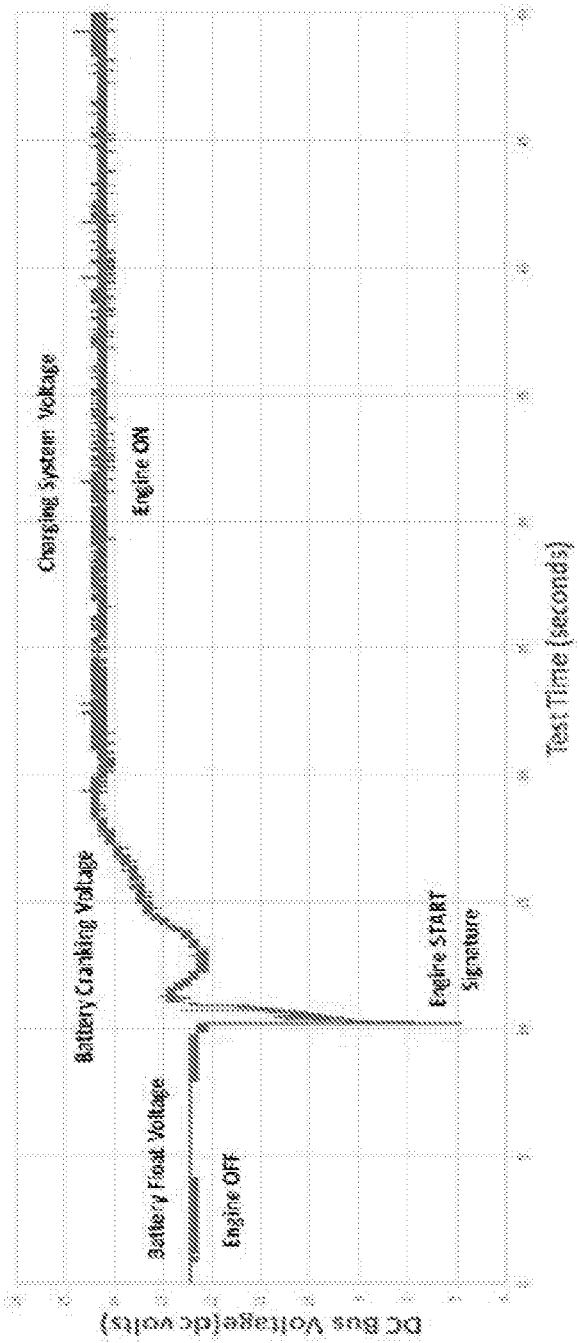

Referring to FIGS. 13-14, an exemplary embodiment and process by which the microprocessor 28 determines the engine condition in order to automatically arm and disarm the glass break sensor device 20 will now be described. In this embodiment, the microprocessor 28 is configured to monitor the vehicle electrical bus voltage for signature conditions indicating whether the engine is off or on. The vehicle electrical bus is connected to OBD port connector pin 16, and the voltage on that pin serves two functions for the glass break sensor device 20: first, it provides power to the glass break sensor device 20; and second, the voltage is monitored as an input signal to determine the present condition of the vehicle's engine.

As can be seen in FIGS. 13A and 13B, the electrical bus input signal 52 is fed as an input to voltage conditioning circuitry 54 of the glass break sensor device 20, which circuitry lowers the input signal voltage to a level compatible with the microprocessor 28 and other module internal circuits. The conditioned electrical bus signal is converted to a digital data value and available to the microprocessor 28 as data to be processed using algorithms to identify the present state of the vehicle engine. The data is converted by an analog-to-digital converter ("ADC") and processed by the microprocessor 28 at a rate suitable enough to allow the detection of fast voltage level changes of the electrical bus signal.

One suitable microprocessor device for implementing these functions is a microcontroller such as the MSP430F51x2 microcontroller marketed by Texas Instruments. The MSP430F51x2 device is an ultra-low-power microcontroller that includes a high-performance 10-bit ADC and an on-chip comparator. As shown in FIGS. 13A and 13B, a suitable circuit design for regulating the vehicle electrical bus voltage for the glass break sensor device 20 includes the MP2451 voltage regulator (such as that marketed by Monolithic Power Systems) and the XC6221 SOT25 voltage regulator (such as that marketed by Torex Semiconductor, Ltd.).

FIG. 14 illustrates an exemplary electrical bus voltage waveform, showing over time, the voltage with the engine off, the engine starting and the engine on. As shown in FIG. 14, three (3) separate engine states or conditions can be determined from the vehicle electrical bus voltage. The three engine conditions are:

Engine START
Engine ON
Engine OFF.

By determining which of the conditions the engine is in at any given time, the microprocessor 28 can set the glass break sensor device 20 to the ARMED or DISARMED states as described below.

The microprocessor 28 can identify the Engine START condition by its signature voltage waveform characteristic: a fast drop of the electrical bus voltage of two or more volts from the battery float levels as the starter motor engages and draws a heavy current from the battery to crank the engine. When the microprocessor 28 identifies the Engine START state, it can set the glass break sensor device 20 to the DISARMED state.

Still referring again to FIG. 14, ignition signature voltage waveforms can be different for different vehicles. In some embodiments, to provide more accuracy in detecting the Engine START condition, the glass break sensor device 20 can include a "data logger" feature that records a specific vehicle's ignition signature and uses that specific signature to improve accuracy in detecting the Engine START condition without having to rely on the process of using accelerometer input to determine whether a false positive has occurred (as described above with respect to FIG. 11).

The microprocessor 28 can identify the Engine ON condition by monitoring the steady-state level of the vehicle electrical bus voltage 52. A constant high voltage level, usually greater than 13 volts, indicates that the vehicle charging system is operating and the engine is on. When the microprocessor 28 identifies this Engine On state, it can set the glass break sensor device 20 to the DISARMED state.

The microprocessor 28 can identify the Engine OFF state by comparing the vehicle electrical bus voltage input 52 over time to the voltage range that would be present at the vehicle battery when the battery is not charging or is not starting the engine. This is considered the battery float voltage. If the range of the electrical bus voltage input 52 indicates that the electrical bus is at a normal battery float voltage, the microprocessor 28 identifies this as the Engine OFF state and sets the glass sensor device 20 to the ARMED state.

When the engine changes from the Engine RUN condition to the Engine OFF condition, it may take time for the battery voltage to drop from the charging voltage level to a normal battery float voltage range. This provides a natural delay from the DISARMED state to the ARMED state as it takes time for the glass sensor device 20 to determine that the engine is positively OFF. In addition, in some embodiments, the glass sensor device 20 can be programmed to provide additional delay in arming. These delays can help to eliminate false alarms that otherwise could result from sounds occurring in the vehicle after the ignition has been turned off but the driver has not left the vehicle.

From the foregoing description, it can be seen that a glass break sensor system of the present invention possesses numerous advantages and provides numerous benefits. For example, it can be quickly and conveniently installed in a vehicle without cutting or splicing vehicle wires. It can be automatically armed and disarmed without the necessity of using a separate fob. It can be installed as a standalone system and can also easily interface with a security system having additional security features.

While certain preferred methods and embodiments of the invention have been described, these have been presented by way of example only, and are not intended to limit the scope of the present invention. Additional advantages and modifications will readily occur to those skilled in the art. Accordingly, departures may be made from details described herein without departing from the spirit or scope of the general inventive concept.

What is claimed is:

1. A security system for a vehicle having an on-board diagnostic ("OBD") data link cable and an OBD port, the system comprising:
   a pass-through OBD connector including an input connector configured to mate with the vehicle OBD data link cable and an output connector configured to mate with the vehicle OBD port;
   a microprocessor;
   a glass break sensor configured to detect a glass breakage event and generate an alarm a trigger signal when glass breakage is detected; and
   a security device;
   wherein the input connector includes a power input configured to be coupled to a vehicle battery voltage input from the OBD data link cable and to provide power to the security system; and
   wherein the microprocessor is configured to:
   use OBD data to monitor whether the vehicle engine is running;
   automatically arm the glass break sensor when the vehicle engine is turned off;
   automatically disarm the glass break sensor when the vehicle engine is on; and
   cause the security device to be activated in response to the trigger signal.

2. The sensor system of claim 1 further comprising an accelerometer configured to detect when the vehicle is in motion and generate a vehicle motion output signal; and
   wherein the microprocessor is configured to determine whether the vehicle is in motion and to use the accelerometer vehicle motion output signal to determine whether an alarm signal generated by the sensor is a false positive.

3. The security system of claim 1, wherein the microprocessor is further configured to:
   communicate with a GPS location component; and
   in response to the trigger signal, cause the GPS component to send a location alert.

4. The security system of claim 1 wherein the security device comprises a vehicle onboard camera and the microprocessor is further configured to:
   communicate with the vehicle onboard camera; and
   in response to an alarm signal generated by the sensor, cause the vehicle onboard camera to capture an image.

5. The security system of claim 1 wherein the microprocessor is further configured to determine whether the vehicle engine is on or off based on the vehicle battery voltage input from the OBD data link cable.

6. The security system of claim 1 wherein the microprocessor is further configured to determine whether the vehicle engine is off based on the vehicle battery voltage input from the OBD data link cable.

7. The security system of claim 1 wherein the microprocessor is further configured to determine whether the vehicle engine is on based on the vehicle battery voltage input from the OBD data link cable.

8. The security system of claim 1 wherein the microprocessor is further configured to determine whether the engine is in a start-up condition based on the vehicle battery voltage input from the OBD data link cable.

9. The security system of claim 1 wherein the security device comprises an audio alarm.

10. The security system of claim 1 wherein the security device comprises a camera.

11. The security system of claim 1 wherein the microprocessor is configured to determine the vehicle engine status based on the vehicle battery voltage signal and to automatically, control power to the security device in response to the engine status.

12. A security system for a vehicle having an on-board diagnostic ("OBD") data link cable and an OBD port, the system comprising:
    a pass-through OBD connector including an input connector configured to mate with the vehicle OBD data link cable and an output connector configured to mate with the vehicle OBD port;
    a microprocessor;
    a glass break sensor configured to detect a glass breakage event and generate a trigger signal when in response to the detection of the glass breakage event; and
    a security device;
    wherein the input connector includes a power input configured to be coupled to a vehicle battery voltage input from the OBD data link cable and to provide power to the security system; and
    wherein the microprocessor is configured to:
    use the vehicle battery voltage input from the OBD data link cable to automatically arm the security device when the vehicle engine is turned off and disarm the security device when the vehicle engine is on; and
    cause the security device to be activated in response to the trigger signal.

13. The security system of claim 12 further comprising an accelerometer configured to detect when the vehicle is in motion and generate a vehicle motion output signal; and
    wherein the microprocessor is configured to determine whether the vehicle is in motion and to use the accelerometer vehicle motion output signal to determine whether an alarm signal generated by the sensor is a false positive.

14. The security system of claim 12 wherein the security device comprises a GPS location component and the microprocessor is timber configured to:
   communicate with the GPS location component; and
   in response to an alarm signal generated by the sensor, cause the GPS location component to generate a location alert.

15. The security system of claim 12 wherein the security device comprises a vehicle onboard camera and the microprocessor is further configured to:
   communicate with the vehicle onboard camera; and
   in response to an alarm signal generated by the sensor, cause the vehicle onboard camera to capture an image.

16. The security system of claim 12 wherein the microprocessor is further configured to determine whether the vehicle engine is off based on the vehicle battery voltage input from the OBD data link cable.

17. The security system of claim 12 wherein the microprocessor is further configured to determine whether the vehicle engine is on based on the vehicle battery voltage input of from the OBD data link cable.

18. The security system of claim 12 wherein the microprocessor is further configured to determine whether the engine is in a start-up state based on the vehicle battery voltage input of the OBD data link cable.

19. The security system of claim 12 wherein the microprocessor is further configured to automatically disarm the glass break sensor when the vehicle engine is in a start-up state.

20. A method for sensing glass breakage in a vehicle having an on-board diagnostic ("OBD") data link cable, the method comprising:
   using a vehicle battery voltage signal from the OBD data link cable to automatically arm a glass break sensor device when the vehicle engine is off and to automatically disarm the glass break sensor device when the vehicle engine is on; and
   generating an alarm signal when the glass break sensor device is armed and detects a glass breakage event.

21. The method of claim 20 further comprising determining whether the vehicle is in motion to determine whether an alarm signal a false positive.

22. The method of claim 20 further comprising determining whether the vehicle engine is in a start-up state based on the vehicle battery voltage signal.

23. The method of claim 22 further comprising automatically disarming the glass break sensor device when the vehicle engine is in a start-up state.

* * * * *

UNITED STATES PATENT AND TRADEMARK OFFICE
CERTIFICATE OF CORRECTION

PATENT NO. : 10,597,000 B2
APPLICATION NO. : 15/549986
DATED : March 24, 2020
INVENTOR(S) : Carl Anthony Avila It is certified that error appears in the above-identified patent and that said Letters Patent is hereby corrected as shown below:

In the Claims

Column 7 Line 44 - delete "an alarm"

Column 8 Line 46 - delete "when"

Signed and Sealed this
Nineteenth Day of May, 2020

Andrei Iancu
*Director of the United States Patent and Trademark Office*